O. G. ARNOT.
ROLLER BEARING.
APPLICATION FILED FEB. 3, 1919.
1,341,873.
Patented June 1, 1920.
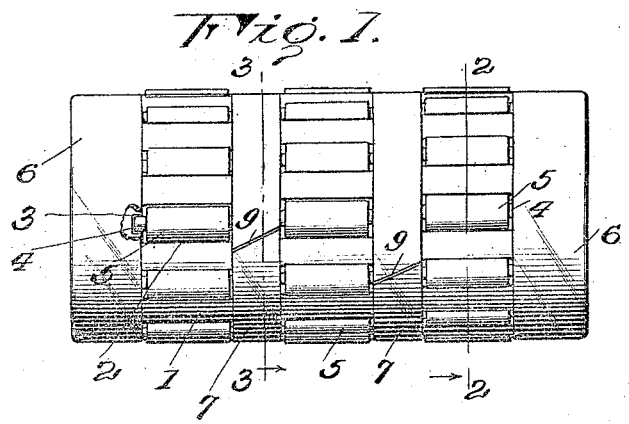
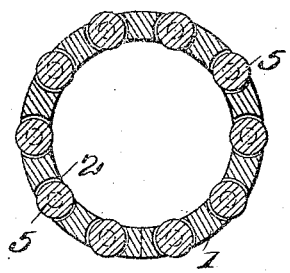
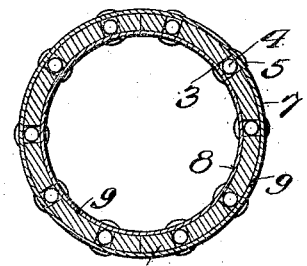
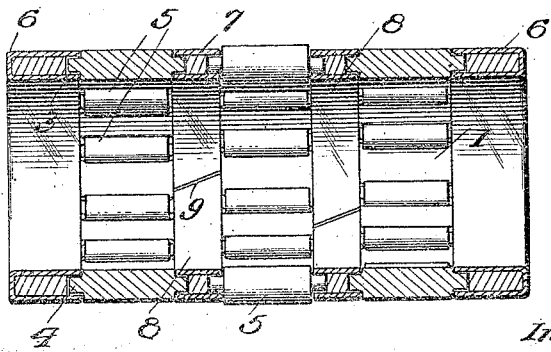
Inventor.
O. G. Arnot
by Lacey & Lacey,
Attys.

UNITED STATES PATENT OFFICE.

OWEN G. ARNOT, OF BAKERSFIELD, CALIFORNIA.

ROLLER-BEARING.

1,341,873.  Specification of Letters Patent.  Patented June 1, 1920.

Application filed February 3, 1919. Serial No. 274,726.

*To all whom it may concern:*

Be it known that I, OWEN G. ARNOT, a citizen of the United States, residing at Bakersfield, in the county of Kern and State of California, have invented certain new and useful Improvements in Roller-Bearings, of which the following is a specification.

The object of this invention is to provide a roller bearing in which the rollers may be readily assembled with the cage and effectually held therein; to provide a cage of simple and inexpensive construction; to provide means for preserving the shape of the cage, and to provide means for distributing the strain throughout the bearing so as to prevent distortion thereof.

The several stated objects and such other objects as will hereinafter incidentally appear are attained in such a device as is illustrated in the accompanying drawings, in which—

Figure 1 is an elevation partly broken away of a roller bearing constructed in accordance with my invention;

Fig. 2 is a transverse section on the line 2—2 of Fig. 1;

Fig. 3 is a section on the line 3—3 of Fig. 1;

Fig. 4 is a longitudinal section.

In carrying out my invention, I employ a cage 1 which will preferably be constructed of sheet steel having slots produced therein in a stamping machine and then rolled into cylindrical form. The slots 2 will extend longitudinally of the cage and in the end walls of each slot will be provided notches 3 to receive the trunnions 4 of the rollers 5. The slots will be so disposed that no two slots will be in axial alinement and the rollers arranged in said slots will, therefore, be staggered throughout the bearing, as shown clearly in Figs. 1 and 4, so that the strain will be distributed equally through the structure and the journal or shaft to which the bearing is applied will run true throughout the life of the bearing. The cage should be of such thickness relative to the diameter of the rollers 5 that the circumferences of the rollers will project slightly beyond both the inner and outer surface of the cage and, therefore, sufficient clearance will be provided to prevent the journal box or the journal engaging and wearing away the surface of the cage. To maintain the cylindrical formation of the cage and prevent spreading thereof, I provide at each end of the same a retaining band or collar 6 which may be conveniently formed by stamping an annulus from sheet metal and then folding the said annulus into U shape, as shown clearly in Fig. 4, the space between the sides of the U being sufficient to just clear the end of the cage so that when the collar is slipped on the cage it will fit snugly and will effectually retain the cylindrical shape of the same. The free edges of each collar will project over the trunnions of the adjacent rollers, as shown in Figs. 1 and 4, and will thereby serve to retain the trunnions in the notches provided therefor in the cage. To retain the inner ends of the rollers in proper position in the cage, I employ an outer resilient ring or band 7 and a similar inner ring or band 8 which are split, as shown at 9, so that they may be readily fitted in place. The band 7 will be so tempered that it will tend to clasp the cage and the trunnions lying under its edges and will, therefore, prevent outward displacement of the rollers while the band or ring 8 will be so tempered that it will tend to expand and will, therefore, prevent inward displacement of the rollers. The parts are so proportioned, of course, that the rollers will clear the surfaces of the retaining bands or rings and frictional contact between the same and the journal or the bearing box will be avoided, the only contact with the surfaces of the journal and the bearing box being that of the rollers so that the journal or shaft may rotate freely and the frictional wear will be minimized.

It will be readily noted that the bearing rollers are staggered so that the strain is distributed equally throughout the bearing and distortion of the cage is thereby avoided. When the parts are to be assembled, the inner retaining rings may be placed in position and the rollers may be then slipped into engagement with the several notches and slots, the outer retaining rings or bands being then sprung over the trunnions or rollers so as to hold them in position. The collars 6 may then be slipped over the ends of the cylinder or cage so as to maintain the shape of the same and aid in retaining the outermost annular series of rollers in their proper positions. The provision of the slots with the notches in their end walls permits the rollers to be easily slipped in position and the resilient retaining bands effectually retain them in the assembled relation. The device can obviously be produced at a low cost and will be found highly efficient in use.

Having thus described the invention, what is claimed as new is:

1. A roller bearing comprising a cylindrical cage, annular series of rollers fitted in the cage, and resilient retaining bands sprung in the cylinder between the series of rollers to prevent inward displacement of the rollers.

2. A roller bearing comprising a cylindrical cage provided with a plurality of longitudinally extending slots and having notches in the end walls of the slots, rollers provided with trunnions engaging said notches, resilient retaining bands fitted about the cylinder and extending over the trunnions of the rollers to prevent outward displacement of the same, and other resilient retaining bands sprung within the cylinder under the trunnions of the rollers to prevent inward displacement thereof.

3. A roller bearing comprising a longitudinally split cylindrical cage having longitudinal slots, rollers fitted in the slots, resilient retaining bands fitted to the cage between the series of rollers to prevent displacement thereof, and U-shaped collars fitted on the ends of the cage to maintain the shape of the cage.

4. A roller bearing comprising a split cylindrical cage provided with longitudinal slots arranged out of axial alinement and having notches in the end walls of the slots, rollers fitted in the slots and provided at their ends with trunnions engaging said notches, resilient retaining bands fitted around the cage and the trunnions between adjacent series of rollers whereby to prevent outward displacement of the rollers, resilient retaining bands fitted within the cage between adjacent series of rollers to prevent inward displacement of the rollers, and U-shaped collars fitted on the ends of the cage and extending over the trunnions to the end series of rollers at both the inner and the outer surfaces of the cage whereby to prevent displacement of said rollers and maintain the shape of the cage.

In testimony whereof I affix my signature.

OWEN G. ARNOT. [L. S.]